US012694477B2

(12) United States Patent
Hu

(10) Patent No.: US 12,694,477 B2
(45) Date of Patent: Jul. 28, 2026

(54) OPTIMIZED IMAGE PROCESSING FILTER

(71) Applicant: Black Sesame Technologies (Chengdu) Co., Ltd., Chengdu (CN)

(72) Inventor: Jinlin Hu, Wuhan (CN)

(73) Assignee: Black Sesame Technologies (Chengdu) Co., Ltd., Chengdu (CN)

( * ) Notice: Subject to any disclaimer, the term of this patent is extended or adjusted under 35 U.S.C. 154(b) by 307 days.

(21) Appl. No.: 18/491,696

(22) Filed: Oct. 20, 2023

(65) Prior Publication Data

US 2024/0135495 A1 Apr. 25, 2024
US 2024/0233082 A9 Jul. 11, 2024

(30) Foreign Application Priority Data

Oct. 21, 2022 (CN) .......................... 202211296796.0

(51) Int. Cl.
*G06T 5/20* (2006.01)
*G06T 7/11* (2017.01)

(52) U.S. Cl.
CPC . *G06T 5/20* (2013.01); *G06T 7/11* (2017.01)

(58) Field of Classification Search
CPC ... G06T 2207/20021; G06T 5/20; G06T 7/11; G06T 5/70; G06T 5/10; G06T 5/00
See application file for complete search history.

(56) References Cited

U.S. PATENT DOCUMENTS 9,928,708 B2 3/2018 Lin et al.
10,176,382 B1 * 1/2019 Owechko ............. G06V 10/803
10,846,846 B2 * 11/2020 Shiratsuchi ........... G06T 3/4053
(Continued)

FOREIGN PATENT DOCUMENTS

CN 101488219 A 7/2009
CN 113643198 A 11/2021
(Continued)

OTHER PUBLICATIONS

Zhang, Lei, et al. "Segmentation algorithm for overlap recognition of seedling lettuce and weeds based on SVM and image blocking." Computers and Electronics in Agriculture 201 (2022): 107284.*
(Continued)

*Primary Examiner* — Emily C Terrell
(74) *Attorney, Agent, or Firm* — FISH & RICHARDSON P.C.

(57) ABSTRACT

An image filtering method, an image filtering device, a controller, and a readable storage medium for image processing. According to the method, an image to be processed is obtained by processing on an original image by a graphics processor unit based on a preset interpolation algorithm, the image to be processed is divided into a plurality of sub-graphs based on a preset specification of a filtering window, the plurality of sub-graphs are divided into a plurality of segmentation blocks based on a preset division rule, a sampling pixel value and a sampling weight value of each of the plurality of segmentation blocks are determined separately, and a filtering value of the image is determined based on the sampling pixel values and the sampling weight values. At least one of the plurality of segmentation blocks includes more than one of the plurality of sub-graphs.

20 Claims, 4 Drawing Sheets

(56) References Cited

U.S. PATENT DOCUMENTS

| | | | |
|---|---|---|---|
| 2008/0219580 A1 | 9/2008 | Porikli | |
| 2009/0028432 A1* | 1/2009 | Rossato | G06T 7/194 |
| | | | 382/173 |
| 2010/0142824 A1* | 6/2010 | Lu | G06T 7/97 |
| | | | 382/275 |
| 2010/0328532 A1* | 12/2010 | Wu | G06V 30/1478 |
| | | | 348/E5.062 |
| 2016/0292837 A1* | 10/2016 | Lakemond | G06T 5/90 |
| 2017/0231550 A1* | 8/2017 | Do | G06T 7/0012 |
| | | | 382/128 |
| 2024/0058683 A1 | 2/2024 | DeAngelis et al. | |

FOREIGN PATENT DOCUMENTS

| | | | |
|---|---|---|---|
| CN | 115409735 | * | 11/2022 |
| WO | WO 2022106016 A1 | | 5/2022 |
| WO | WO 2022121077 A1 | | 6/2022 |

OTHER PUBLICATIONS

Fukushima, "Efficient Computational Scheduling of Box and Gaussian FIR Filtering for CPU Microarchitecture: Efficient Computational Scheduling of Box and Gaussian FIR Filtering for CPU Microarchitecture," Paper, IEEE, Asia-Pacific Signal and Information Processing Association Annual Summit and Conference, Nov. 12-15, 2018, 5 pages.
Office Action in Chinese Appln. No. 202211296796.0, mailed Dec. 18, 2025, 10 pages (with English translation).

* cited by examiner

Acquiring an image to be processed — S100

Dividing the image to be processed into a plurality of sub-graphs based on a preset specification of a filtering window — S110

Dividing the plurality of sub-graphs into a plurality of segmentation blocks based on a preset division rule — S120

Determining a sampling pixel value and a sampling weight value of each of the plurality of segmentation blocks separately — S130

Determining, based on the sampling pixel value and the sampling weight value of each of the plurality of segmentation blocks, a filtering value of the image to be processed — S140

FIG. 1

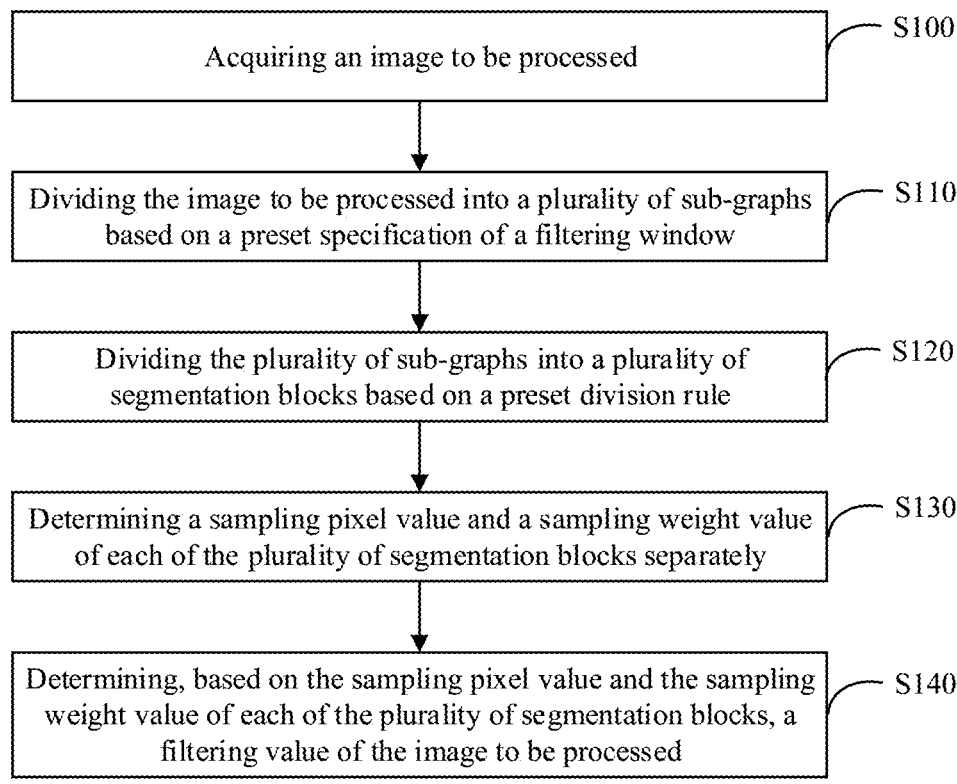

| X(0,0) | X(0,1) | X(0,2) |
| X(1,0) | X(1,1) | X(1,2) |
| X(2,0) | X(2,1) | X(2,2) |

FIG. 2

OPTIMIZED IMAGE PROCESSING FILTER

CROSS-REFERENCE TO RELATED APPLICATION

This application claims the benefit under 35 U.S.C. § 119(a) of the filing date of Chinese Patent Application No. 202211296796.0, filed in the Chinese Patent Office on Oct. 21, 2022. The disclosure of the foregoing application is herein incorporated by reference in its entirety.

TECHNICAL FIELD

The present document relates to the field of image processing technologies, and in particular, to an optimized image processing filter, an image filtering method, an image filtering device, a controller, and a readable storage medium.

BACKGROUND

In existing applications, electronic devices, such as mobile terminals, generally use Center Processing Unit (CPU) to perform image filtering processing. With continuous improvement of image pixels, a higher requirement is put forward for performance of CPU. Especially for some low-end mobile terminals, performance of CPU configured therein is poor. Meanwhile, an image filtering process occupies most of hardware resources, resulting in slow response, low processing efficiency, and even crashes when processing other tasks. Not only efficiency in the image filtering processing is low, but also usage experience of users is seriously affected. Therefore, how to improve efficiency of image filtering while reducing occupation of hardware resources of CPU has become one of urgent technical problems for those skilled in the art.

SUMMARY

In view of this, the present technique is dedicated to providing an image filtering method, an image filtering device, a controller, and a readable storage medium to improve efficiency of image filtering processing, while reducing occupation of hardware resources of CPU and improving experience of users.

According to a first aspect, the present technique provides an image filtering method, including:

acquiring an image to be processed, where the image to be processed is obtained by processing an original image by a graphics processor unit based on a preset interpolation algorithm;

dividing the image to be processed into a plurality of sub-graphs based on a preset specification of a filtering window;

dividing the plurality of sub-graphs into a plurality of segmentation blocks based on a preset division rule, where at least one of the plurality of segmentation blocks includes more than one of the plurality of sub-graphs;

determining a sampling pixel value and a sampling weight value of each of the plurality of segmentation blocks separately; and determining, based on the sampling pixel value and the sampling weight value of each of the plurality of segmentation blocks, a filtering value of the image to be processed.

In some optional embodiments, determining the sampling pixel value and the sampling weight value of each of the plurality of segmentation blocks separately includes:

determining a sampling point of a target segmentation block and a preset weight corresponding to each sub-graph included in the target segmentation block;

where the target segmentation block is any one of the plurality of segmentation blocks;

determining a pixel value corresponding to the sampling point of the target segmentation block to be a sampling pixel value of the target segmentation block; and determining a sum of preset weights of all sub-graphs included in the target segmentation block to be a sampling weight value of the target segmentation block.

In some optional embodiments, determining, based on the sampling pixel value and the sampling weight value of each of the plurality of segmentation blocks, the filtering value of the image to be processed includes:

calculating, based on the sampling pixel value and the sampling weight value of each of the plurality of segmentation blocks, a total filtering value;

calculating a sum of sampling weight values of the plurality of segmentation blocks to obtain a total weight value; and calculating a quotient between the total filtering value and the total weight value to obtain the filtering value of the image to be processed.

In some optional embodiments, calculating, based on the sampling pixel value and the sampling weight value of each of the plurality of segmentation blocks, the total filtering value includes:

calculating a product of the sampling pixel value and the sampling weight value of each of the plurality of segmentation blocks to obtain a filtering value of each of the plurality of segmentation blocks; and calculating a sum of filtering values of the plurality of segmentation blocks to obtain the total filtering value.

In some optional embodiments, dividing the image to be processed into the plurality of sub-graphs based on the preset specification of the filtering window includes:

dividing the image to be processed into $(2N+1)^2$ sub-graphs based on the preset specification of the filtering window, where N is an integer greater than or equal to 1.

In some optional embodiments, the dividing the plurality of sub-graphs into the plurality of segmentation blocks based on the preset division rule includes:

dividing the plurality of sub-graphs into one first-type segmentation block and a plurality of second-type segmentation blocks;

where the first-type segmentation block includes one sub-graph, and the second-type segmentation block includes two or four sub-graphs.

In some optional embodiments, sub-graphs in a segmentation block including two sub-graphs are arranged in a pattern of two rows and one column, or a pattern of one row and two columns; and sub-graphs in a segmentation block including four sub-graphs are arranged in a pattern of two rows and two columns.

According to a second aspect, the present technique provides an image filtering device, including:

an acquisition unit, configured to acquire an image to be processed, where the image to be processed is obtained by processing an original image by a graphics processor unit based on a preset interpolation algorithm;

a first dividing unit, configured to divide the image to be processed into a plurality of sub-graphs based on a preset specification of a filtering window;

a second dividing unit, configured to divide the plurality of sub-graphs into a plurality of segmentation blocks based on a preset division rule, where at least one of the plurality of segmentation blocks includes more than one of the plurality of sub-graphs;

a first determining unit, configured to determine a sampling pixel value and a sampling weight value of each of the plurality of segmentation blocks separately; and a second determining unit, configured to determine, based on the sampling pixel value and the sampling weight value of each of the plurality of segmentation blocks, a filtering value of the image to be processed.

According to a third aspect, the present technique provides a controller including: a memory and a processor; where the memory stores a program applicable for execution by the processor to implement the image filtering method according to any one of the first aspects of the present technique.

According to a fourth aspect, the present technique provides a computer-readable storage medium, where a computer program is stored, and the computer program is executed by a processor to implement steps of the image filtering method according to any one of the first aspects of the present technique.

Based on contents described above, according to the image filtering method provided by the present technique, when the image to be processed is obtained by processing the original image by a graphics processor unit based on the preset interpolation algorithm, the image to be processed is divided into a plurality of sub-graphs based on the preset specification of the filtering window. The plurality of sub-graphs are divided into a plurality of segmentation blocks based on the preset division rule. Then, a sampling pixel value and a sampling weight value of each of the plurality of segmentation blocks is determined separately. Finally, the filtering value of the image to be processed is determined based on the sampling pixel value and the sampling weight value of each of the plurality of segmentation blocks.

According to the image filtering method provided by the present technique, at least one of the plurality of segmentation blocks used for calculating the filtering value of the image to be processed includes more than one of the plurality of sub-graphs. By dividing the segmentation blocks, a number of times and computational complexity of collection of pixel values may be effectively reduced. Moreover, the image to be processed is obtained by GPU using the preset interpolation algorithm, therefore an interpolation characteristic of GPU may be utilized to improve accuracy of pixel acquisition, thereby improving efficiency of filtering processing while ensuring accuracy of image filtering processing. Furthermore, the method may be applied to a controller independent of CPU, so that occupation of hardware resources of CPU throughout a whole image processing process may be effectively reduced, thereby helping to improve a response speed of CPU to other tasks and improving experience of users.

BRIEF DESCRIPTION OF THE DRAWINGS

In order to more clearly describe the technical solution in the present technique or in the prior art, accompanying drawings needed in embodiments or the prior art will be briefly introduced below. Obviously, the accompanying drawings in the following description are some embodiments of the present technique. For those skilled in the art, other drawings may be obtained based on these drawings without paying creative efforts.

FIG. 1 is a flowchart of an image filtering method according to an embodiment of the present technique.

FIG. 2 is a schematic diagram of division of a sub-graphs according to an embodiment of the present technique.

DETAILED DESCRIPTION OF THE EMBODIMENTS

Figure 3A:
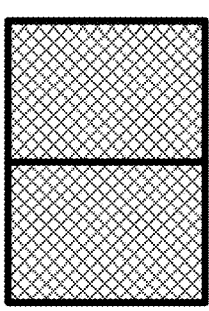
FIG. 3a to FIG. 3c are schematic diagrams of different types of segmentation blocks according to embodiments of the present technique.

Technical solutions in embodiments of the present technique are described clearly and completely below with reference to accompanying drawings of the embodiments of the present technique. Apparently, the described embodiments are only a part, but not all of the embodiments of the present technique. All other embodiments that may be obtained by those skilled in the art based on the embodiments in the present technique may fall into the protection scope of the present technique.

In existing applications, mobile terminals (such as mobile phones and tablet computers) generally use Center Processing Unit (CPU) to perform image filtering processing. With continuous improvement of image pixels, a higher requirement is put forward for performance of CPU. Especially for some low-end mobile terminals, performance of CPU configured therein is poor. Meanwhile, an image filtering process occupies most of hardware resources, resulting in slow response, low processing efficiency, and even crashes when processing other tasks. Not only efficiency in image filtering processing is low, but also usage experience of users is seriously affected.

In existing technologies, in order to solve this problem, an improvement measure is adopted, such as using a NEON technology to optimize a boxfilter algorithm commonly used in an image filtering process. According to this method, efficiency of image filtering processing may be improved to a certain extent. However, this method is still implemented by CPU and cannot effectively reduce a CPU load, making it difficult to effectively solve the problem described above.

According to the content mentioned above, the present technique provides a image filtering method, applied to other controllers independent of CPU, such as a Graphics Processing Unit (GPU). The method no longer relies on implementation by CPU, thus a load of CPU may be effectively reduced. Moreover, at least one of the plurality of segmentation blocks used for calculating the filtering value of the image to be processed includes more than one of the plurality of sub-graphs. By dividing the segmentation blocks, a number of times and computational complexity of collection of pixel values may be effectively reduced. Moreover, the image to be processed is obtained by GPU using the preset interpolation algorithm, therefore an interpolation characteristic of GPU may be utilized to improve accuracy of pixel acquisition, thereby improving efficiency of filtering processing while ensuring accuracy of image filtering processing, helping to improve a response speed of CPU to other tasks and improving experience of users.

Referring to FIG. 1, FIG. 1 is a flowchart of an image filtering method according to an embodiment of the present technique. The image filtering method provided by the present embodiment includes the following steps.

S100: Acquiring an image to be processed.

According to a principle of image processing of GPU, an original image need to be performed an interpolation processing based on a preset interpolation algorithm by GPU to obtain an image. Then the image may be converted into a texture format supported by GPU. Therefore, the image to be processed mentioned in this embodiment and subsequent embodiments are obtained after a process performed on the original image based on the preset interpolation algorithm by GPU. For a specific implementation process of the preset interpolation algorithm applied to GPU, relevant technologies may be referred to for implementation, and the present technique does not limit this.

S110: Dividing the image to be processed into a plurality of sub-graphs based on a preset specification of a filtering window.

It should be understood that the filtering window is a sliding window in a process for traversing all pixels of the image to be processed, which needs to be slid throughout the whole image to be processed during a filtering process. The preset specification of the filtering window, that is, a quantity of pixels included in the filtering window, needs to be determined based on a size of the image to be processed, hardware performance of the GPU, and specific filtering requirements in practical applications.

Furthermore, the image to be processed may be divided into the plurality of sub-graphs based on the preset specification of the filtering window. As a preferred implementation, the image to be processed may be divided into $(2N+1)^2$ sub-graphs, where N is an integer greater than or equal to 1. Based on this limitation, it should be known that a minimum number of the sub-graphs is 9 and the number is odd. Dividing the image to be processed into sub-graphs of an odd quantity may ensure symmetry at an edge or a corner of the image to be processed, and also facilitate division of segmentation blocks in subsequent steps. A specific implementation of dividing the plurality of sub-graphs into different segmentation blocks will be expanded in subsequent content and will not described in detail herein.

Optionally, referring to FIG. 2, FIG. 2 is a schematic diagram of division of a sub-graphs according to an embodiment of the present technique. In the embodiment shown in FIG. 2, taking N=1 as an example, a specific implementation of the dividing the image to be processed into 9 sub-graphs may be illustrated. Therein, (i, j) represents a coordinate position of any one sub-graph in the image to be processed, where i∈[0, 2], j∈[0, 2], and X (i, j) represents a sampling pixel value of the sub-graph corresponding to coordinates (i, j). When N takes other integers greater than 1, a sub-graph division method may also be implemented as shown in FIG. 2, and there will be no further examples here.

A specific determination process of the coordinate position and the sampling pixel value of any sub-graph will be expanded in subsequent content and will not be described in detail herein.

S120: Dividing the plurality of sub-graphs into a plurality of segmentation blocks based on a preset division rule.

As mentioned earlier, during the process of image filtering processing, all pixels in the image to be processed are required to be covered. Therefore, in a process of dividing the segmentation blocks of the present step, no sub-graphs are omitted. In order to effectively improve efficiency of the image filtering processing, at least one of the plurality of segmentation blocks obtained after the division includes more than one of the plurality of sub-graphs.

Optionally, in a specific implementation, all of the plurality of sub-graphs are divided into one first-type segmentation block and a plurality of second-type segmentation blocks. Therein, the first-type segmentation block includes one sub-graph, and the first-type segmentation block should be selected as a sub-graph located at the center of the image to be processed. Taking FIG. 2 as an example, a sub-graph with coordinates (1, 1) should be selected as the first-type segmentation block.

Figure 3B:
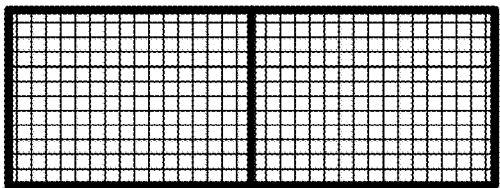
Figure 3C:
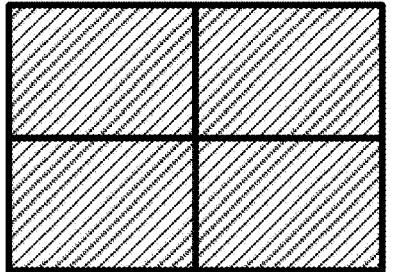

Furthermore, the second-type segmentation block includes two or four sub-graphs. Specifically, for a segmentation block including two sub-graphs, optional construction modes include FIG. 3a and FIG. 3b. Therein, as shown in FIG. 3a, the two sub-graphs in a segmentation block are arranged in a pattern of two rows and one column. In addition, the two sub-graphs in a segmentation block may also be arranged in a pattern of one row and two columns as shown in FIG. 3b. For a segmentation block including four sub-graphs, the four sub-graphs may be arranged in a pattern of two rows and two columns as shown in FIG. 3c. For the segmentation blocks shown in FIG. 3a to FIG. 3c, distribution of the sub-graphs are symmetric in a top-down direction, or a left-right direction, or a diagonal direction.

Figure 4:
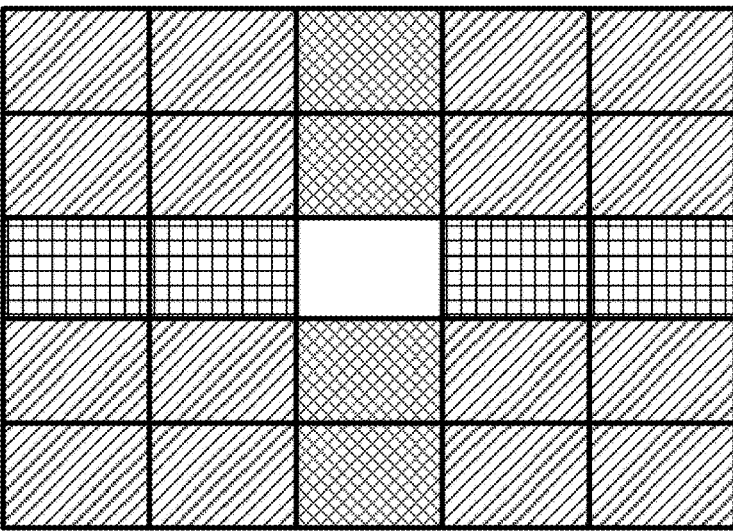
FIG. 4 is a schematic diagram of division result of a segmentation block of an image to be processed according to the embodiment of the present technique.

Based on a basic preset division rule for the segmentation blocks mentioned above, by combining different numbers and types of segmentation blocks, all $(2N+1)^2$ sub-graphs in the image to be processed may be covered, thereby achieving full coverage of all pixels. Taking an image to be processed divided into 25 sub-graphs as an example, the segmentation blocks obtained from division may be shown in FIG. 4, which includes a first-type segmentation block, four segmentation blocks as shown in FIG. 3c, two segmentation blocks as shown in FIG. 3a, and two segmentation blocks as shown in FIG. 3b.

S130: Determining a sampling pixel value and a sampling weight value of each of the plurality of segmentation blocks separately.

In a practical application, GPU needs to convert an image to its own supported texture format when obtaining the image to be processed. Meanwhile, the original image needs to be normalized by GPU. Therefore, regardless of a specific size of the original image, a range of values in a horizontal direction and a vertical direction of the image to be processed obtained after GPU interpolation sampling is the same, i.e. [0, 1]. Therefore, for an original image with a specification of row×col, a corresponding horizontal movement step is 1/col between adjacent pixels in the image to be processed, and accordingly, a vertical movement step is 1/row between adjacent pixels in the image to be processed, where col is a width of the original image and row is a height of the original image.

Based on the content described above, a coordinate position of any sub-graph in the image to be processed may be taken as a reference. Of course, as a preferred implementation, when the image to be processed is divided into $(2N+1)^2$ sub-graphs, the coordinate position of the sub-graph located at the center of the image to be processed (i.e. the sub-graph with coordinates of (N, N)) is selected as the reference. It should be understood that in a practical application, for any sub-graph, a position coordinate of a pixel point located at the center of the sub-graph may be used as a position coordinate of the sub-graph for subsequent calculation processing.

Furthermore, based on the position coordinates of the sub-graph which is taken as the reference, the position coordinates of each sub-graph may be determined separately according to the step size mentioned above and a mutual position relationship between the sub-graphs. Assuming the position coordinates of the sub-graph which is taken as the reference being (dx, dy), step-sized movement is performed in the horizontal and vertical direction to determine the positions of other sampling points. In the horizontal direction, a position after one step to the right is dx+1/col, and a position after one step to the left is dx−1/col. In the vertical direction, a position after one step down is dy+1/row, and a position after one step up is dy−1/row.

Based on the content described above, each segmentation block is taken as a target segmentation block. First, a sampling point of the target segmentation block is determined according to the method mentioned above, and a pixel value corresponding to the sampling point of the target segmentation block is used as a sampling pixel value of the target segmentation block to obtain a sampling pixel value corresponding to each segmentation block. Optionally, as shown by black dots in FIG. 5, when the image to be processed is divided into 9 sub-graphs, a sampling point of the segmentation block located at the center of the image to be processed is also a center of the image to be processed. According to a determination method of the sampling point mentioned above, when the segmentation block shown in FIG. 3a corresponding to two adjacent sub-graphs in the vertical direction is sampled, the sampling point corresponds to a center position of the adjacent two sub-graphs; when the segmentation block shown in FIG. 3b corresponding to two adjacent sub-graphs in the horizontal direction is sampled, the sampling point corresponds to the center position of the adjacent sub-graphs. Furthermore, for the segmentation block shown in FIG. 3c, the sampling point corresponds to a midpoint (not shown in FIG. 5) where the four sub-graphs intersect.

Meanwhile, a preset weight value of each sub-graph included in the target segmentation block also need to be determined. In a practical application, the preset weight value of each sub-graph is directly related to a filter actually used. For example, in a case of using a boxfilter, the preset weight values of all sub-graphs are all 1. In a case of using a Gaussian filter or other filters, the preset weight value of each sub-graph needs to be adjusted accordingly.

Furthermore, by calculating a sum of preset weight values corresponding to all sub-graphs in the target segmentation block, a sampling weight value of the target segmentation block may be obtained.

Taking a segmentation block shown in FIG. 3a or FIG. 3b as an example, in a case of using the boxfilter, the preset weight values of all sub-graph are 1, therefore, a sampling weight value of the segmentation block is 2. Correspondingly, as the segmentation block shown in FIG. 3c includes four sub-graphs, a sampling weight value of the segmentation block corresponding to FIG. 3c is 4. It should be understood that for segmentation blocks with the same structure in the image to be processed, their corresponding sampling weight values are the same.

S140: Determining, based on the sampling pixel value and the sampling weight value of each of the plurality of segmentation blocks, a filtering value of the image to be processed.

For each segmentation block, a product of the sampling pixel value and the sampling weight value corresponding to each of the plurality of segmentation blocks is calculated to obtain a filtering value corresponding to each of the plurality of segmentation blocks. Furthermore, a sum of filtering values of the plurality of segmentation blocks is calculated to obtain the total filtering value. That is, the total filtering value is calculated based on the sampling pixel value and sampling weight value corresponding to each of the plurality of segmentation blocks. Meanwhile, a sum of sampling weight values of the plurality of segmentation blocks is calculated to obtain a total weight value.

Based on the calculation results described above, a quotient between the total filtering value and the total weight value is calculated to obtain the filtering value of the image to be processed.

Figure 5:
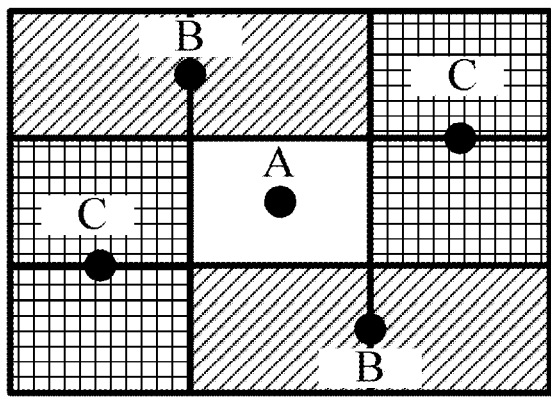
FIG. 5 is a schematic diagram of sampling points of each segmentation block in an image to be processed according to the embodiment of the present technique.

A segmentation result of the image to be processed shown in FIG. 5 is still taken as an example. As a sampling pixel value of a segmentation block A is X1 and a sampling weight value of the segmentation block A is 1, a filtering value of the segmentation block A is X1×1. By analogy, as a sampling pixel value of a segmentation block B is X2 and a sampling weight value of the segmentation block B is 2, a filtering value of the segmentation block B is X2×2 (including two segmentation blocks B). As a sampling pixel value of a segmentation block C is X3 and a sampling weight value of the segmentation block C is 2, a filtering value of the segmentation block C is X3×2 (including two segmentation blocks C). Furthermore, a total filtering value corresponding to the image to be processed SUM=X1×1+2×X2×2+2×X3×2 and a total weight value is 1+2×2+2×2=5. A filtering value of the image to be processed is SUM/5.

In conclusion, according to the image filtering method provided by the present technique, at least one of the plurality of segmentation blocks used for calculating the filtering value of the image to be processed includes more than one of the plurality of sub-graphs. By dividing the segmentation blocks, a number of times and computational complexity of collection of pixel values may be effectively reduced. Moreover, the image to be processed is obtained by GPU using the preset interpolation algorithm, therefore an interpolation characteristic of GPU may be utilized to improve accuracy of pixel acquisition, thereby improving efficiency of filtering processing while ensuring accuracy of image filtering processing. Furthermore, the method is applied to GPU, occupation of hardware resources of CPU throughout a whole image processing process may be effectively reduced, thereby helping to improve a response speed of CPU to other tasks and improving experience of users.

In order to provide a more detailed explanation of a principle of improving efficiency of image filtering processing by using the present method, in the following, an application scenario shown in FIG. 5 may be taken as an example to introduce a process of filtering processing performed on an image to be processed shown in FIG. 5 in existing technologies.

The image to be processed is divided into 9 sub-graphs. With reference to FIG. 2, sampling pixel values of sub-graphs are represented as X (0, 0), X (0, 1), X (0, 2), X (1, 0), X (1, 1), X (1, 2), X (2, 0), X (2, 1), and X (2, 2), respectively. Meanwhile, preset weight values of the sub-graphs are denoted as w (0, 0), w (0, 1), w (0, 2), w (1, 0), w (1, 1), w (1, 2), w (2, 0), w (2, 1), and w (2, 2).

Based on precondition described above, denoting a filtering value of X (i, j)×W (i, j) corresponding to each sub-graph to be calculated in the prior art as sub_Sum (i, j), then there is Sub_Sum(0,0)=$X$(0,0)×$W$(0,0);

Sub_Sum(0,1)=$X$(0,1)×$W$(0,1);

Sub_Sum(0,2)=$X$(0,2)×$W$(0,2);

Sub_Sum(1,0)=$X$(1,0)×$W$(1,0);

Sub_Sum(1,1)=$X$(1,1)×$W$(1,1);

Sub_Sum(1,2)=$X$(1,2)×$W$(1,2);

Sub_Sum(2,0)=$X$(2,0)×$W$(2,0);

Sub_Sum(2,1)=$X$(2,1)×$W$(2,1);

Sub_Sum(2,2)=$X$(2,2)×$W$(2,2).

It can be seen that a process of calculation of the filtering values of all sub-graphs requires a total of 9 multiplication operations in the prior art.

Furthermore, a total filtering value, denoted as SUM, is calculated, and then

SUM=sub_Sum(0,0)+sub_Sum(0,1)+sub_Sum(0,2)+
sub_Sum(1,0)+sub_Sum(1,1)+sub_Sum(1,2)+
sub_Sum(2,0)+sub_Sum(2,1)+sub_Sum(2,2).

A process of calculation of the total filtering value requires a total of 8 addition operations.

A filtering value of the image to be processed is calculated by a formula of RESULT=SUM/9, that is, a total of 1 division operation is required.

In conclusion, for a boxfilter of 3×3, a total computational complexity in the prior art is: 9 multiplication operations+8 addition operations+1 division operation.

When an image filtering method provided by the present technique is used, a filtering process of the image to be processed as shown in FIG. 5 is shown in the following.

Taking a position coordinate of a segmentation block A being (1, 1) as a basis, position coordinates of segmentation blocks B and segmentation blocks C are determined. Specifically, the segmentation blocks B correspond to two sampling points, namely X (0, 0.5) located between X (0, 0) and X (0, 1), and X (2, 1.5) located between X (2, 1) and X (2, 2). The segmentation blocks C correspond to two sampling points similarly, namely X (1.5, 0) located between X (1, 0) and X (2, 0), and X (0.5, 2) located between X (0, 2) and X (1, 2).

Based on content described above, calculations are carried out in the following steps.

(1) Calculating a filtering value of each sampling point corresponding to the segmentation block A, the segmentation blocks B, and the segmentation blocks C, where the filtering value of the segmentation block A is: X (1, 1)×W (1, 1); and the filtering values of the segmentation blocks B are:

$X$(0,0.5)×($w$(1,0)+$w$(2,0));

$X$(2,1.5)×($w$(0,2)+$w$(1,2));

where, w (1, 0)+w (2, 0) and w (0, 2)+w (1, 2) may be calculated in advance and are not included in addition calculations.

The filtering values of the segmentation block C are:

$X$(1.5,0)×($w$(0,0)+$w$(0,1));

$X$(0.5,2)×($w$(2,1)+$w$(2,2));

where, w (0, 0)+w (0, 1) and w (2, 1)+w (2, 2) may be calculated in advance and are not included in addition calculations.

That is to say, a total of 5 multiplication operations are performed in this solution.

(2) Calculating a total filtering value SUM and a total weight value.

The total filtering value SUM=X (1, 1)×W (1, 1)+X (1.5, 0)×(w(1, 0)+w (2, 0))+X (0.5, 2)×(w(0, 2)+w (1, 2))+X (0, 0.5)×(w(0, 0)+w (0, 1))+X (2, 1.5)×(w(2, 1)+w (2, 2)). A total of 4 addition operations are performed.

The total weight value is: 2× (w (1,0)+w (2,0))+2× W (0,0)+w (0,1)+1× W (1,1)

The total weight value may be calculated in advance and is not included in the addition calculation.

(3) Calculating a filtering value of the image to be processed, denoted as RESULT.

RESULT=SUM/(2×($w$(1,0)+$w$(2,0))+2×$W$(0,0)+$w$(0,
1)+1×$W$(1,1).

1 division calculation in total is performed.

For the present solution, a total calculation amount is:

5 multiplication operations+4 addition operations+1 division operation

In conclusion, in an actual operation, multiplication and division operations have a main impact on performance compared with a relatively small impact of addition operations. Therefore, a main difference is that, compared to existing technical solutions, the present solution may save 4 multiplication operations. And performance may be theoretically improved by 80% with a main reason of reduction in sampling points. In the prior art, nine points need to be calculated, while in the present solution, five points need to be calculated.

Correspondingly, for an image to be processed divided into 25 sub-graphs, only 9 points are required to be sampled using the method provided in the present technique, which may theoretically improve performance by 177%. For an image to be processed divided into 49 sub-graphs, normally 49 points are required to be sampled for calculation. By using the image filtering method provided in the present technique, 17 points are required to be sampled, which may theoretically improve performance by 188%.

An image filtering device provided by the present technique will be introduced in the following. The image filtering device provided by the present technique belongs to the same application concept as the image filtering method provided by the embodiments of the present technique, and may execute the image filtering method provided by any embodiment of the present technique, with corresponding functional modules and beneficial effects for executing the image filtering method. The technical detail not fully described in this embodiment may be referred to the image filtering method provided in the embodiment of this technique, and will not be further repeated here.

Figure 6:
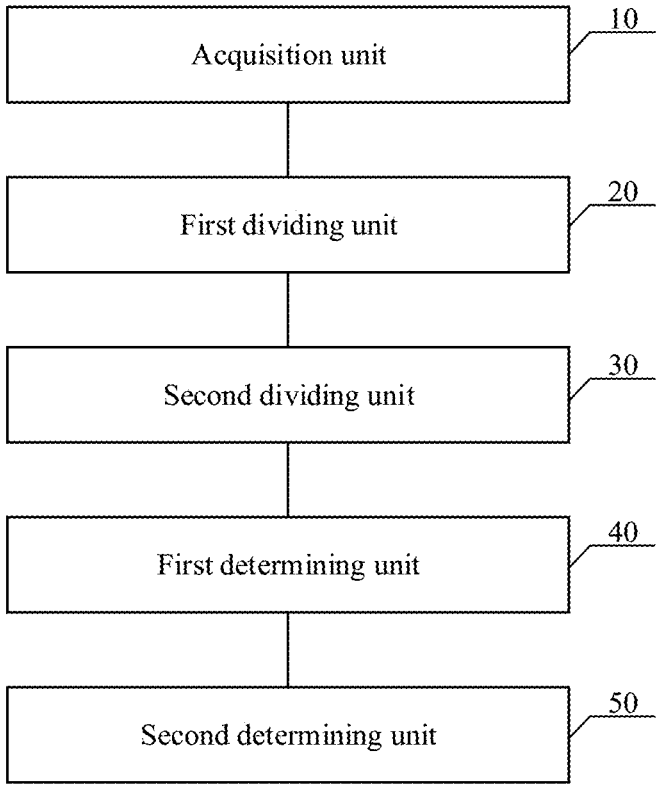
FIG. 6 is a structural block diagram of an image filtering device according to an embodiment of the present technique.

Referring to FIG. 6, FIG. 6 is a structural block diagram of an image filtering device according to an embodiment of the present technique. The image filtering device provided by the present embodiment includes:

an acquisition unit 10, configured to acquire an image to be processed, where the image to be processed is obtained by processing an original image by a graphics processor unit based on a preset interpolation algorithm;

a first dividing unit 20, configured to divide the image to be processed into a plurality of sub-graphs based on a preset specification of a filtering window;

a second dividing unit 30, configured to divide the plurality of sub-graphs into a plurality of segmentation blocks based on a preset division rule, where at least one of the plurality of segmentation blocks includes more than one of the plurality of sub-graphs;

a first determination unit 40, configured to determine a sampling pixel value and a sampling weight value of each of the plurality of segmentation blocks separately; and a second determination unit 50, configured to determine, based on the sampling pixel value and the sampling weight value of each of the plurality of segmentation blocks, a filtering value of the image to be processed.

Optionally, the first determination unit 40 is configured to determine a sampling pixel value and a sampling weight value of each of the plurality of segmentation blocks separately, and further configured to:

determine a sampling point of a target segmentation block and a preset weight corresponding to each sub-graph included in the target segmentation block, where the target segmentation block is any one of the plurality of segmentation blocks;

determine a pixel value corresponding to the sampling point of the target segmentation block to be a sampling pixel value of the target segmentation block; and determine a sum of preset weights of all sub-graphs included in the target segmentation block to be a sampling weight value of the target segmentation block.

Optionally, the second determination unit 50 is configured to determine, based on the sampling pixel value and the sampling weight value of each of the plurality of segmentation blocks, a filtering value of the image to be processed, and further configured to:

calculate, based on the sampling pixel value and the sampling weight value of each of the plurality of segmentation blocks, a total filtering value;

calculate a sum of sampling weight values of the plurality of segmentation blocks to obtain a total weight value; and calculate a quotient between the total filtering value and the total weight value to obtain the filtering value of the image to be processed.

Optionally, the second determination unit 50 is configured to calculate, based on the sampling pixel value and the sampling weight value corresponding to each of the plurality of segmentation blocks, a total filtering value, and further configured to:

calculate a product of the sampling pixel value and the sampling weight value of each of the plurality of segmentation blocks to obtain a filtering value of each of the plurality of segmentation blocks; and calculate a sum of filtering values of the plurality of segmentation blocks to obtain the total filtering value.

Optionally, the first dividing unit 20 is configured to divide the image to be processed into a plurality of sub-graphs according to a preset specification of a filtering window, and further configured to:

divide the image to be processed into $(2N+1)^2$ sub-graphs based on the preset specification of the filtering window, where N is an integer greater than or equal to 1.

Optionally, the second dividing unit 60 is configured to divide the plurality of sub-graphs into the plurality of segmentation blocks based on the preset division rule, and further configured to:

divide the plurality of sub-graphs into one first-type segmentation block and a plurality of second-type segmentation blocks, where the first-type segmentation block includes one sub-graph, and the second-type segmentation block includes two or four sub-graphs.

Optionally, sub-graphs in a segmentation block including two sub-graphs are arranged in a pattern of two rows and one column, or a pattern of one row and two columns; and sub-graphs in a segmentation block including four sub-graphs, are arranged in a pattern of two rows and two columns.

Figure 7:
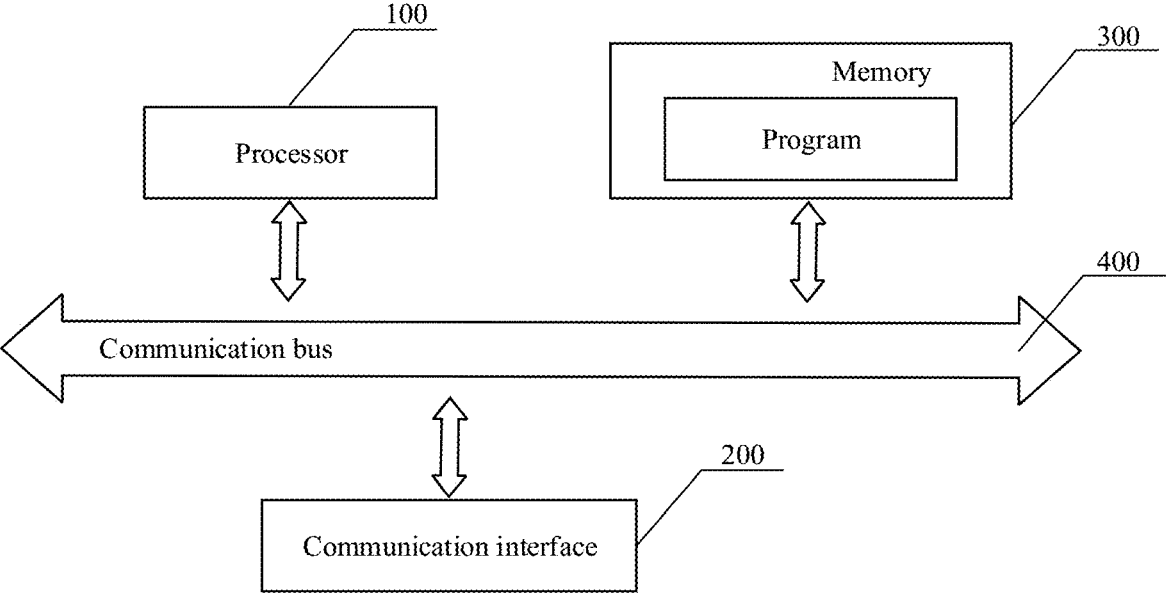
FIG. 7 is a schematic structural diagram of a controller according to an embodiment of the present technique.

Optionally, referring to FIG. 7, FIG. 7 is a schematic structural diagram of a controller according to an embodiment of the present technique. As shown in FIG. 7, the controller may include at least one processor 100, at least one communication interface 200, at least one memory 300, and at least one communication bus 400.

In an embodiment of the present technique, there are at least one processor 100, at least one communication interface 200, at least one memory 300, and at least one communication bus 400, and the processor 100, the communication interface 200, and the memory 300 communicate with each other through the communication bus 400. Obviously, communication connection shown in FIG. 7 for the processor 100, the communication interface 200, the memory 300, and the communication bus 400 are only optional.

Optionally, the communication interface 200 may be an interface for communication modules, such as an interface for a GSM module.

The processor 100 may be a central processing unit (CPU), an Application Specific Integrated Circuit (ASIC), or one or more integrated circuits configured to implement embodiments of the present technique.

The memory 300, where an application program is stored, may include a high-speed RAM memory, or may also include a non-volatile memory, such as at least one disk storage.

The processor 100 is specifically used to execute application programs in the memory to implement any embodiment of the image filtering method described above.

In some embodiments, a computer readable storage medium is also provided by an embodiment of the present technique, such as a floppy disk, an optical disc, a hard disk, a flash memory, a USB flash drive, an SD (Secure Digital Memory Card) card, an MMC (Multimedia Card) card, etc., in which one or more instructions to implement the above steps are stored, When one or more instructions are executed by one or more processors, the processor executes the image filtering method described above. Referring to the previous description for specific implementation details, details may not be further repeated here.

In addition to the methods and devices described above, embodiments of the present technique may also be a computer program product, including computer program instructions. The computer program instructions may cause the processor to execute the steps described in the image filtering methods according to various embodiments of the present technique when run by the processor.

The computer program product may be written in any combination of one or more programming languages to execute the operations of the embodiments of the present technique. The programming languages include object-oriented programming languages such as Java, C++, and conventional procedural programming languages such as "C" or similar programming languages. Program code may be completely executed on user computing devices, partially executed on user devices, executed as a standalone software package, partially executed on user computing devices, partially executed on remote computing devices, or completely executed on remote computing devices or servers.

Those skilled in the art may understand that the content disclosed in this technique may undergo various variations and improvements. For example, the various devices or components described above may be implemented through hardware, software, firmware, or some or all of the three in combination.

Furthermore, although various references have been made to certain units in the methods according to the disclosed embodiments, any number of different units may be used and run on clients and/or servers. Units are only illustrative, and different aspects of methods and different methods may use different units.

A flowchart is used in this technique to illustrate the steps of a method according to the disclosed embodiment. It should be understood that the steps before or after may not be carried out precisely in order. On the contrary, various steps may be processed in reverse order or simultaneously. Meanwhile, other operations may also be added to these processes.

A person of ordinary skill in the art may understand that all or part of the steps in the above methods may be completed by instructing relevant hardware through computer programs, which may be stored in computer readable storage medium, such as read-only memory. Optionally, all or part of the steps of the above embodiments may also be implemented using one or more integrated circuits. Correspondingly, the modules/units in the above embodiments may be implemented in the form of hardware or software functional modules. The present technique is not limited to any specific form of combination of hardware and software.

Unless otherwise defined, all terms used herein have the same meanings as those commonly understood by ordinary technical personnel in the field to which this technique belongs. It should also be understood that terms such as those defined in regular dictionaries should be interpreted as having meanings that are consistent with their meanings in the context of the relevant technology, and should not be interpreted in idealized or overly formal terms, unless explicitly defined here.

The above is description of the present technique and should not be considered as a limitation. Although several exemplary embodiments of the present technique have been described, those skilled in the art should understand that modifications may be made to the exemplary embodiments without departing from the disclosure and advantages described in the present document. Therefore, all modifications derived from the described techniques are included within the scope of this document. It should be understood that the above is a description of the current technique and should not be considered limited to specific embodiments described above.

What is claimed is:

1. An image filtering method, comprising:

acquiring an image to be processed, wherein the image to be processed is obtained by processing an original image by a graphics processor unit based on a preset interpolation algorithm;

dividing the image to be processed into a plurality of sub-graphs based on a preset specification of a filtering window;

dividing the plurality of sub-graphs into a plurality of segmentation blocks based on a preset division rule, wherein at least one of the plurality of segmentation blocks comprises more than one of the plurality of sub-graphs;

determining a sampling pixel value and a sampling weight value of each of the plurality of segmentation blocks separately; and determining, based on the sampling pixel value and the sampling weight value of each of the plurality of segmentation blocks, a filtering value of the image to be processed.

2. The method according to claim 1, wherein determining the sampling pixel value and the sampling weight value of each of the plurality of segmentation blocks separately comprises:

determining a sampling point of a target segmentation block and a preset weight corresponding to each sub-graph comprised in the target segmentation block, wherein the target segmentation block is any one of the plurality of segmentation blocks;

determining a pixel value corresponding to the sampling point of the target segmentation block to be a sampling pixel value of the target segmentation block; and determining a sum of preset weights of all sub-graphs comprised in the target segmentation block to be a sampling weight value of the target segmentation block.

3. The method according to claim 1, wherein determining, based on the sampling pixel value and the sampling weight value of each of the plurality of segmentation blocks, the filtering value of the image to be processed comprises:

calculating, based on the sampling pixel value and the sampling weight value of each of the plurality of segmentation blocks, a total filtering value;

calculating a sum of sampling weight values of the plurality of segmentation blocks to obtain a total weight value; and calculating a quotient between the total filtering value and the total weight value to obtain the filtering value of the image to be processed.

4. The method according to claim 3, wherein calculating, based on the sampling pixel value and the sampling weight value of each of the plurality of segmentation blocks, the total filtering value comprises:

calculating a product of the sampling pixel value and the sampling weight value of each of the plurality of segmentation blocks to obtain a filtering value of each of the plurality of segmentation blocks; and calculating a sum of filtering values of the plurality of segmentation blocks to obtain the total filtering value.

5. The method according to claim 1, wherein dividing the image to be processed into the plurality of sub-graphs based on the preset specification of the filtering window comprises:

dividing the image to be processed into $(2N+1)^2$ sub-graphs based on the preset specification of the filtering window, wherein N is an integer greater than or equal to 1.

6. The method according to claim 1, wherein dividing the plurality of sub-graphs into the plurality of segmentation blocks based on the preset division rule comprises:

dividing the plurality of sub-graphs into one first-type segmentation block and a plurality of second-type segmentation blocks, wherein the first-type segmentation block comprises one sub-graph, and the second-type segmentation block comprises two or four sub-graphs.

7. The method according to claim 6, wherein sub-graphs in a segmentation block comprising two sub-graphs arranged in a pattern of two rows and one column, or a pattern of one row and two columns; and sub-graphs in the segmentation block comprising four sub-graphs are arranged in a pattern of two rows and two columns.

8. A controller, comprising: a memory and a processor; wherein the memory is configured to store one or more instructions that, once executed by a processor, cause the processor to perform operations, the operations comprising:

acquiring an image to be processed, wherein the image to be processed is obtained by processing an original image by a graphics processor unit based on a preset interpolation algorithm;

dividing the image to be processed into a plurality of sub-graphs based on a preset specification of a filtering window;

dividing the plurality of sub-graphs into a plurality of segmentation blocks based on a preset division rule, wherein at least one of the plurality of segmentation blocks comprises more than one of the plurality of sub-graphs;

determining a sampling pixel value and a sampling weight value of each of the plurality of segmentation blocks separately; and determining, based on the sampling pixel value and the sampling weight value of each of the plurality of segmentation blocks, a filtering value of the image to be processed.

9. One or more non-transitory computer-readable storage media configured to store one or more instructions that, once executed by a processor, cause the processor to perform operations, the operations comprising:

acquiring an image to be processed, wherein the image to be processed is obtained by processing an original image by a graphics processor unit based on a preset interpolation algorithm;

dividing the image to be processed into a plurality of sub-graphs based on a preset specification of a filtering window;

dividing the plurality of sub-graphs into a plurality of segmentation blocks based on a preset division rule, wherein at least one of the plurality of segmentation blocks comprises more than one of the plurality of sub-graphs;

determining a sampling pixel value and a sampling weight value of each of the plurality of segmentation blocks separately; and determining, based on the sampling pixel value and the sampling weight value of each of the plurality of segmentation blocks, a filtering value of the image to be processed.

10. The controller according to claim 8, wherein determining the sampling pixel value and the sampling weight value of each of the plurality of segmentation blocks separately comprises:

determining a sampling point of a target segmentation block and a preset weight corresponding to each sub-graph comprised in the target segmentation block, wherein the target segmentation block is any one of the plurality of segmentation blocks;

determining a pixel value corresponding to the sampling point of the target segmentation block to be a sampling pixel value of the target segmentation block; and determining a sum of preset weights of all sub-graphs comprised in the target segmentation block to be a sampling weight value of the target segmentation block.

11. The controller according to claim 8, wherein determining, based on the sampling pixel value and the sampling weight value of each of the plurality of segmentation blocks, the filtering value of the image to be processed comprises:

calculating, based on the sampling pixel value and the sampling weight value of each of the plurality of segmentation blocks, a total filtering value;

calculating a sum of sampling weight values of the plurality of segmentation blocks to obtain a total weight value; and calculating a quotient between the total filtering value and the total weight value to obtain the filtering value of the image to be processed.

12. The controller according to claim 11, wherein calculating, based on the sampling pixel value and the sampling weight value of each of the plurality of segmentation blocks, the total filtering value comprises:

calculating a product of the sampling pixel value and the sampling weight value of each of the plurality of segmentation blocks to obtain a filtering value of each of the plurality of segmentation blocks; and calculating a sum of filtering values of the plurality of segmentation blocks to obtain the total filtering value.

13. The controller according to claim 8, wherein dividing the image to be processed into the plurality of sub-graphs based on the preset specification of the filtering window comprises:

dividing the image to be processed into $(2N+1)^2$ sub-graphs based on the preset specification of the filtering window, wherein N is an integer greater than or equal to 1.

14. The controller according to claim 8, wherein dividing the plurality of sub-graphs into the plurality of segmentation blocks based on the preset division rule comprises:

dividing the plurality of sub-graphs into one first-type segmentation block and a plurality of second-type segmentation blocks, wherein the first-type segmentation block comprises one sub-graph, and the second-type segmentation block comprises two or four sub-graphs.

15. The controller according to claim 14, wherein sub-graphs in a segmentation block comprising two sub-graphs arranged in a pattern of two rows and one column, or a pattern of one row and two columns; and sub-graphs in the segmentation block comprising four sub-graphs are arranged in a pattern of two rows and two columns.

16. The one or more non-transitory computer-readable storage media according to claim 9, wherein determining the sampling pixel value and the sampling weight value of each of the plurality of segmentation blocks separately comprises:

determining a sampling point of a target segmentation block and a preset weight corresponding to each sub-graph comprised in the target segmentation block, wherein the target segmentation block is any one of the plurality of segmentation blocks;

determining a pixel value corresponding to the sampling point of the target segmentation block to be a sampling pixel value of the target segmentation block; and determining a sum of preset weights of all sub-graphs comprised in the target segmentation block to be a sampling weight value of the target segmentation block.

17. The one or more non-transitory computer-readable storage media according to claim 9, wherein determining, based on the sampling pixel value and the sampling weight value of each of the plurality of segmentation blocks, the filtering value of the image to be processed comprises:

calculating, based on the sampling pixel value and the sampling weight value of each of the plurality of segmentation blocks, a total filtering value;

calculating a sum of sampling weight values of the plurality of segmentation blocks to obtain a total weight value; and calculating a quotient between the total filtering value and the total weight value to obtain the filtering value of the image to be processed.

18. The one or more non-transitory computer-readable storage media according to claim 17, wherein calculating, based on the sampling pixel value and the sampling weight value of each of the plurality of segmentation blocks, the total filtering value comprises:

calculating a product of the sampling pixel value and the sampling weight value of each of the plurality of segmentation blocks to obtain a filtering value of each of the plurality of segmentation blocks; and calculating a sum of filtering values of the plurality of segmentation blocks to obtain the total filtering value.

19. The one or more non-transitory computer-readable storage media according to claim 9, wherein dividing the image to be processed into the plurality of sub-graphs based on the preset specification of the filtering window comprises:

dividing the image to be processed into $(2N+1)^2$ sub-graphs based on the preset specification of the filtering window, wherein N is an integer greater than or equal to 1.

20. The one or more non-transitory computer-readable storage media according to claim 9, wherein dividing the plurality of sub-graphs into the plurality of segmentation blocks based on the preset division rule comprises:

dividing the plurality of sub-graphs into one first-type segmentation block and a plurality of second-type segmentation blocks, wherein the first-type segmentation block comprises one sub-graph, and the second-type segmentation block comprises two or four sub-graphs.

\* \* \* \* \*